United States Patent
Ono et al.

(10) Patent No.: US 9,525,296 B2
(45) Date of Patent: Dec. 20, 2016

(54) BATTERY STATE MONITORING CIRCUIT AND BATTERY DEVICE

(71) Applicant: Seiko Instruments Inc., Chiba-shi, Chiba (JP)

(72) Inventors: Takashi Ono, Chiba (JP); Fumihiko Maetani, Chiba (JP); Toshiyuki Koike, Chiba (JP)

(73) Assignee: SII Semiconductor Corporation (JP)

( * ) Notice: Subject to any disclaimer, the term of this patent is extended or adjusted under 35 U.S.C. 154(b) by 155 days.

(21) Appl. No.: 14/564,739

(22) Filed: Dec. 9, 2014

(65) Prior Publication Data
US 2015/0162775 A1 Jun. 11, 2015

(30) Foreign Application Priority Data

Dec. 11, 2013 (JP) .................................. 2013-256343
Oct. 24, 2014 (JP) .................................. 2014-217643

(51) Int. Cl.
  *H02J 7/00* (2006.01)
(52) U.S. Cl.
  CPC ............ *H02J 7/0063* (2013.01); *H02J 7/0031* (2013.01); *H02J 2007/0039* (2013.01)
(58) Field of Classification Search
  CPC  H02J 7/0063; H02J 7/0031; H02J 2007/0039; H02J 2007/004; H02J 7/0029
  See application file for complete search history.

(56) References Cited

U.S. PATENT DOCUMENTS

| | | | | |
|---|---|---|---|---|
| 7,737,663 | B2* | 6/2010 | Sakurai .................. | H02J 7/0031 320/134 |
| 8,598,855 | B2* | 12/2013 | Bucur .................... | H02J 7/0031 323/282 |
| 8,896,268 | B2* | 11/2014 | Sakurai .................... | H02H 3/08 320/132 |
| 9,048,672 | B2* | 6/2015 | Shibata .................. | H02J 7/0029 |
| 2001/0052759 | A1* | 12/2001 | Sakurai .................. | H02J 7/0031 320/134 |
| 2002/0172857 | A1* | 11/2002 | Sakurai .................. | H02J 7/0031 429/61 |
| 2003/0197532 | A1* | 10/2003 | Tsuchida ............ | H03K 17/0822 327/108 |
| 2009/0072790 | A1* | 3/2009 | Ibrahim ................ | H02J 7/0031 320/134 |
| 2013/0057221 | A1* | 3/2013 | Shibata .................. | H02J 7/0029 320/134 |
| 2013/0093404 | A1* | 4/2013 | Park ........................ | H02M 1/32 323/273 |

FOREIGN PATENT DOCUMENTS

JP    2006-101696 A    4/2006

\* cited by examiner

*Primary Examiner* — Nha Nguyen
(74) *Attorney, Agent, or Firm* — Brinks Gilson & Lione

(57) ABSTRACT

Provided is a battery device with high convenience, which is capable of setting overcurrent release impedance to be low. The battery device includes: a first comparator circuit for detecting an overcurrent based on a first reference voltage; and a second comparator circuit for outputting an overcurrent release voltage control signal based on a second reference voltage that is higher than the first reference voltage.

2 Claims, 4 Drawing Sheets

BATTERY STATE MONITORING CIRCUIT AND BATTERY DEVICE

RELATED APPLICATIONS

This application claims priority under 35 U.S.C. §119 to Japanese Patent Application Nos. 2013-256343 filed on Dec. 11, 2013 and 2014-217643 filed on Oct. 24, 2014, the entire contents of which are hereby incorporated by reference.

BACKGROUND OF THE INVENTION

1. Field of the Invention

The present invention relates to a battery state monitoring circuit and a battery device, and more particularly, to a technology of preventing an overcurrent from flowing through a battery or a device connected to the battery.

2. Description of the Related Art

FIG. 3 illustrates a circuit diagram of a related-art battery device. The related-art battery device includes a secondary battery 1, a charge/discharge control switch 2, a charge/discharge protection circuit 3, and external terminals 4 and 5. The charge/discharge protection circuit 3 includes a control circuit 22, a pull-down circuit 24, and an overcurrent detection circuit 35.

Next, an operation of the related-art battery device is described.

A voltage of the overcurrent detection terminal 14 is determined based on a resistive component of the charge/discharge control switch 2 and a current flowing through a load connected between the external terminal 4 and the external terminal 5. When abnormality occurs in the load, such as a short-circuit between the external terminal 4 and the external terminal 5, the load current is increased to raise the voltage of the overcurrent detection terminal 14.

When the voltage of the overcurrent detection terminal 14 exceeds an overcurrent detection voltage of the overcurrent detection circuit 35, the overcurrent detection circuit 35 outputs a detection signal. When receiving the detection signal, the control circuit 22 controls the charge/discharge control switch 2 so as to interrupt a discharge current. This state is referred to as "discharge overcurrent state". On the other hand, when the voltage of the overcurrent detection terminal 14 falls below the overcurrent detection voltage of the overcurrent detection circuit 35, the overcurrent detection circuit 35 outputs a release signal to release the discharge overcurrent state (see, for example, Japanese Patent Application Laid-open No. 2006-101696).

In the discharge overcurrent state, the control circuit 22 turns on the pull-down circuit 24 to pull down the overcurrent detection terminal 14. Specifically, when the load returns to a normal state, the voltage of the overcurrent detection terminal 14 is decreased. Then, when the voltage of the overcurrent detection terminal 14 falls below the overcurrent detection voltage, the overcurrent detection circuit 35 releases the discharge overcurrent state. When receiving the release signal of the current detection circuit 35, the control circuit 22 controls the charge/discharge control switch 2 to restart the discharge. In this case, load impedance at which the discharge is restarted is referred to as "overcurrent release impedance".

The pull-down circuit 24 is configured to be turned on when the load enters an abnormal state, and hence the discharge current flows via the pull-down circuit 24 in this case. Thus, the pull-down circuit 24 is set so as to have large impedance.

Specifically, the voltage of the overcurrent detection terminal 14 does not fall below the overcurrent detection voltage unless the load impedance becomes larger than the impedance of the pull-down circuit 24, and hence the discharge may not be restarted when the load impedance is not so large.

SUMMARY OF THE INVENTION

The present invention has been devised in order to solve the problem described above, and provides a battery device with high user convenience.

In order to solve the related-art problem, a battery state monitoring circuit according to one embodiment of the present invention is configured as follows.

The battery state monitoring circuit includes: an overcurrent detection terminal for inputting a voltage generated in a charge/discharge control switch; a pull-down circuit connected to the overcurrent detection terminal, for pulling down the overcurrent detection terminal in an overcurrent state; a first comparator circuit for comparing a voltage of the overcurrent detection terminal with a first reference voltage, and outputting an overcurrent detection signal when the voltage of the overcurrent detection terminal exceeds the first reference voltage; a second comparator circuit for comparing the voltage of the overcurrent detection terminal with a second reference voltage that is higher than the first reference voltage, and outputting an overcurrent release voltage control signal when the voltage of the overcurrent detection terminal exceeds the second reference voltage; and a control circuit for turning off the charge/discharge control switch and on the pull-down circuit when the control circuit receives the overcurrent detection signal, and for switching an overcurrent release voltage to the second reference voltage when the control circuit receives the overcurrent release voltage control signal.

The battery device according to one embodiment of the present invention can set overcurrent release impedance to be low, and hence the discharge can be restarted even when a load has not so large load impedance, resulting in improved convenience.

DETAILED DESCRIPTION OF THE PREFERRED EMBODIMENTS

Now, embodiments of the present invention are described with reference to the accompanying drawings.

<First Embodiment>

Figure 1:
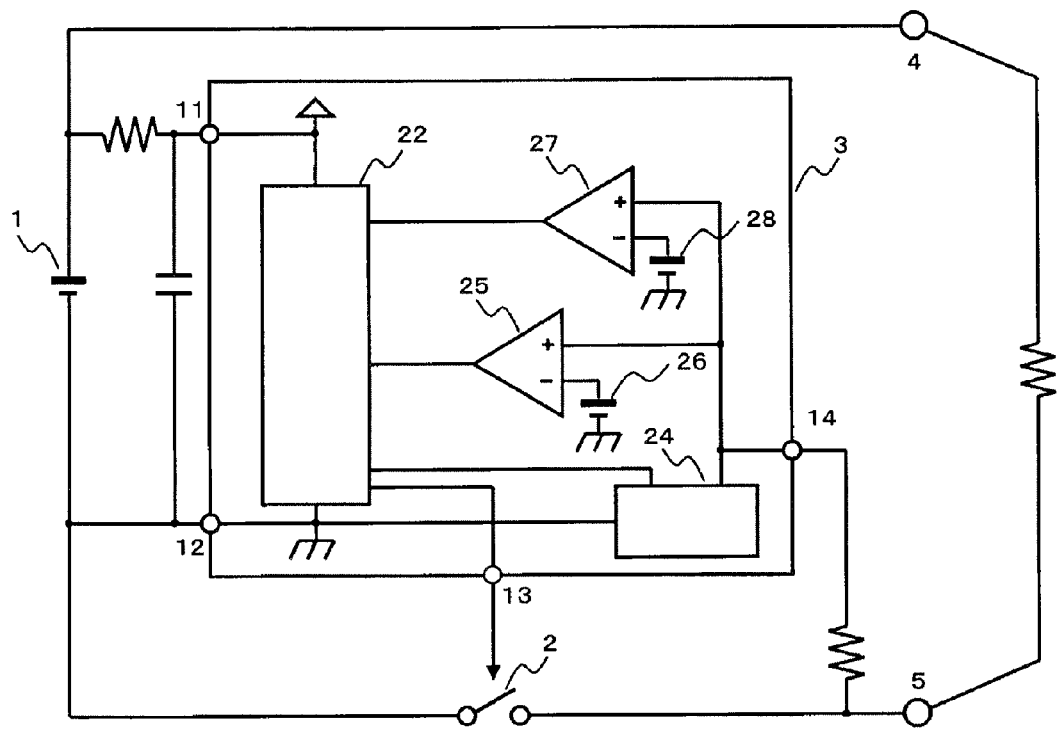
FIG. 1 is a circuit diagram of a battery device according to a first embodiment of the present invention.

FIG. 1 is a circuit diagram of a battery device according to a first embodiment of the present invention.

The battery device according to the first embodiment includes a secondary battery 1, a charge/discharge control switch 2, a battery state monitoring circuit 3, and external terminals 4 and 5.

The battery state monitoring circuit 3 includes a control circuit 22, a pull-down circuit 24, an overcurrent detection comparator circuit 25, an overcurrent release comparator circuit 27, an overcurrent detection reference voltage circuit 26, an overcurrent release reference voltage circuit 28, a positive power supply terminal 11, a negative power supply terminal 12, a charge/discharge control signal output terminal 13, and an overcurrent detection terminal 14.

The secondary battery 1 has a positive terminal connected to the external terminal 4 and the positive power supply terminal 11 and a negative terminal connected to the negative power supply terminal 12 and one terminal of the charge/discharge control switch 2. The charge/discharge control switch 2 has a control terminal connected to the charge/discharge control signal output terminal 13. The other terminal of the charge/discharge control switch 2 is connected to the overcurrent detection terminal 14 and the external terminal 5.

The control circuit 22 has a first input terminal connected to the positive power supply terminal 11, a second input terminal connected to the negative power supply terminal 12, a third input terminal connected to an output terminal of the comparator circuit 25, a fourth input terminal connected to an output terminal of the comparator circuit 27, a first output terminal connected to the charge/discharge control signal output terminal 13, and a second output terminal connected to a first input terminal of the pull-down circuit 24.

The comparator circuit 25 has a first input terminal connected to the overcurrent detection terminal 14 and a second input terminal connected to an output terminal of the reference voltage circuit 26. The comparator circuit 27 has a first input terminal connected to the overcurrent detection terminal 14 and a second input terminal connected to an output terminal of the reference voltage circuit 28. The pull-down circuit 24 has a second input terminal connected to the negative power supply terminal 12 and an output terminal connected to the overcurrent detection terminal 14.

Next, an operation of the battery device according to the first embodiment is described.

When a load is connected between the external terminal 4 and the external terminal 5, a potential difference is generated between the external terminal 4 and the external terminal 5 depending on a current flowing through the load and a resistive component of the charge/discharge control switch 2. The battery state monitoring circuit 3 monitors the potential difference through the overcurrent detection terminal 14, to thereby protect the battery device from a discharge overcurrent. In this case, a voltage of the reference voltage circuit 26 is an overcurrent detection voltage, and a voltage of the reference voltage circuit 28 is an overcurrent release voltage. Then, the voltage of the reference voltage circuit 28 is set to be higher than the voltage of the reference voltage circuit 26.

When abnormality such as a short-circuit occurs in the load to increase a load current so that the voltage of the overcurrent detection terminal 14 exceeds the voltage of the reference voltage circuit 26, the comparator circuit 25 outputs a detection signal. When receiving the detection signal, the control circuit 22 controls the charge/discharge control switch 2 so as to interrupt a discharge current. In addition, the control circuit 22 turns on the pull-down circuit 24 to pull down the overcurrent detection terminal 14. This state is referred to as "discharge overcurrent state".

In the discharge overcurrent state, the voltage of the overcurrent detection terminal 14 is raised due to the load. When the load returns to a normal state, that is, when load impedance increases, the voltage of the overcurrent detection terminal 14 is decreased by the pull-down circuit 24. Then, when the voltage of the overcurrent detection terminal 14 falls below the overcurrent release voltage, the control circuit 22 releases the discharge overcurrent state, and controls the charge/discharge control switch 2 so as to restart the discharge. In this case, load impedance at which the discharge is restarted is referred to as "overcurrent release impedance".

At this time, the control circuit 22 switches the overcurrent release voltage depending on the voltage of the overcurrent detection terminal 14. The overcurrent release voltage is set to be the voltage of the reference voltage circuit 26 when the voltage of the overcurrent detection terminal 14 is lower than the output voltage of the reference voltage circuit 28, and to be the voltage of the reference voltage circuit 28 when the voltage of the overcurrent detection terminal 14 is equal to or higher than the voltage of the reference voltage circuit 28.

When the load impedance is small, the voltage of the overcurrent detection terminal 14 in the discharge overcurrent state is equal to or higher than the voltage of the reference voltage circuit 28. Thus, the control circuit 22 sets the overcurrent release voltage to be the voltage of the reference voltage circuit 28 higher than the voltage of the reference voltage circuit 26.

Consequently, even when the load has small impedance and small overcurrent release impedance, the control circuit 22 can release the overcurrent state. After the release, the control circuit 22 turns on the charge/discharge control switch 2 and turns off the pull-down circuit 24. In this manner, the battery device can return to the normal operating state.

As described above, the battery device according to this embodiment can set the overcurrent release voltage depending on the impedance of the load, and hence even when the load has small impedance, the overcurrent can be reliably released.

<Second Embodiment>

Figure 2:
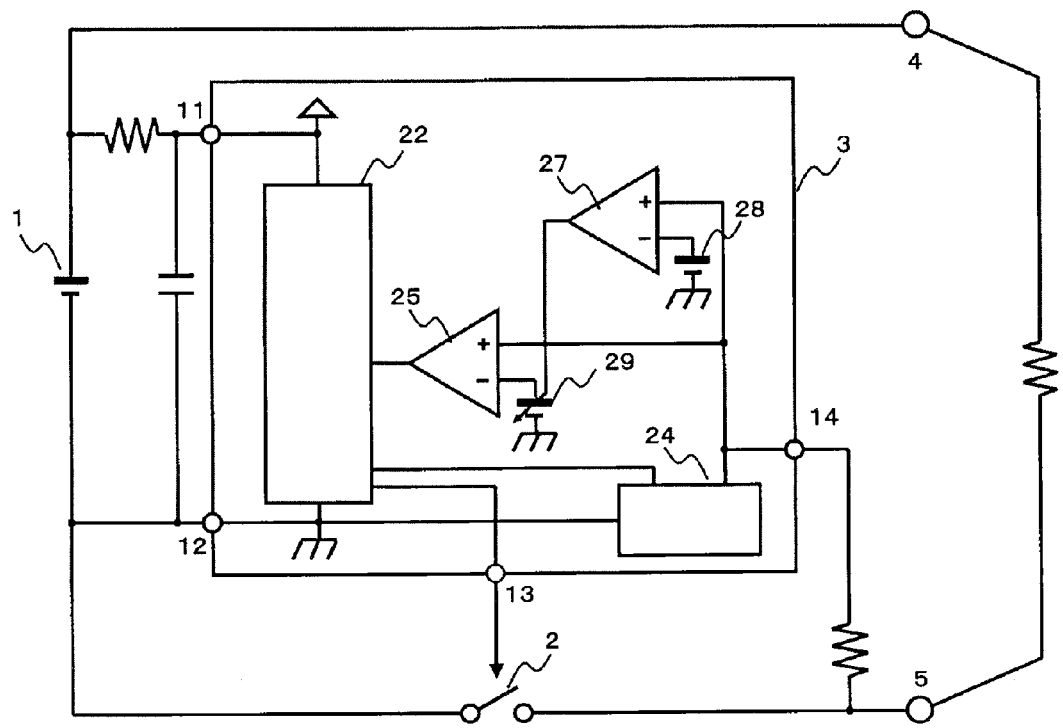
FIG. 2 is a circuit diagram of a battery device according to a second embodiment of the present invention.
Figure 3:
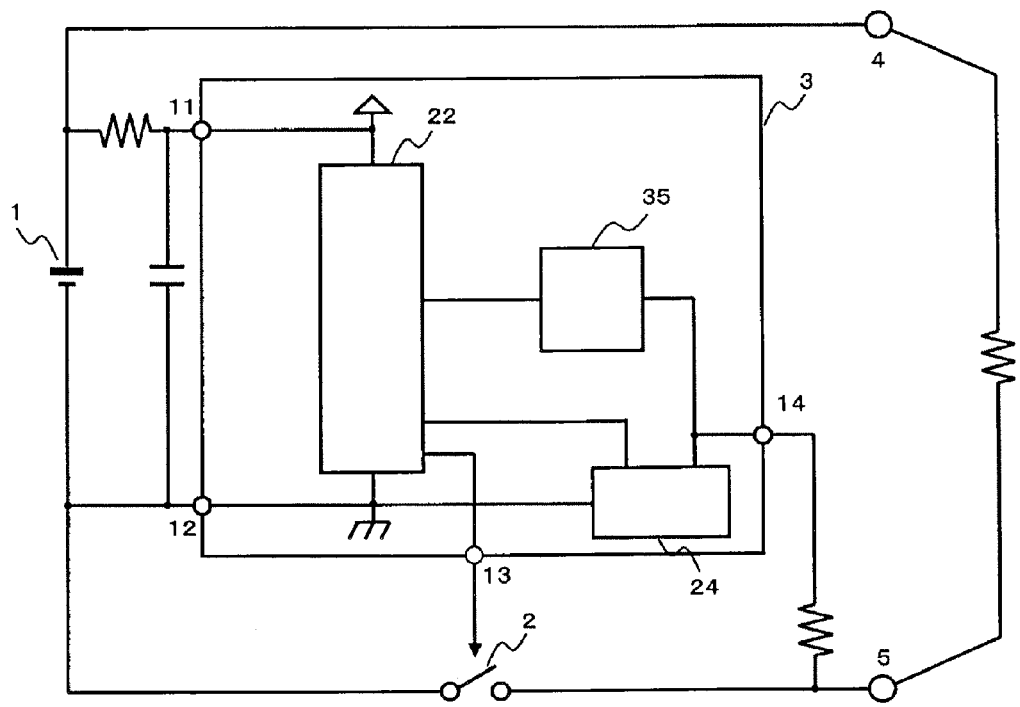
FIG. 3 is a circuit diagram of a related-art battery device.

FIG. 2 is a circuit diagram of a battery device according to a second embodiment of the present invention.

A battery state monitoring circuit 3 of the battery device according to the second embodiment includes a control circuit 22, a pull-down circuit 24, a comparator circuit 25, a comparator circuit 27, a reference voltage circuit 29, a reference voltage circuit 28, a positive power supply terminal 11, a negative power supply terminal 12, a charge/discharge control signal output terminal 13, and an overcurrent detection terminal 14.

The comparator circuit 27 has an output terminal connected to a control terminal of the reference voltage circuit 29. The reference voltage circuit 29 switches its output voltage depending on a signal input to the control terminal. Other circuits and connection relationships are the same as those in the battery device according to the first embodiment.

Next, an operation of overcurrent detection release of the battery device according to the second embodiment is described.

In a discharge overcurrent state, a voltage of the overcurrent detection terminal 14 is increased due to a load. At this time, an overcurrent release voltage is switched depending on the voltage of the overcurrent detection terminal 14. When the voltage of the overcurrent detection terminal 14 exceeds an output voltage of the reference voltage circuit 28, the voltage of the reference voltage circuit 29 is switched to a higher voltage based on a detection signal output from the comparator circuit 27. In this case, the voltage of the reference voltage circuit 29 is switched to a voltage equal to or higher than the voltage of the reference voltage circuit 28, and this voltage is referred to as "overcurrent release voltage".

When load impedance is small, the voltage of the overcurrent detection terminal 14 in the discharge overcurrent state is equal to or higher than the voltage of the reference voltage circuit 28. Thus, the voltage of the reference voltage circuit 29 is switched to a higher voltage, and this voltage is referred to as "overcurrent release voltage".

Consequently, even when the load has small impedance and small overcurrent release impedance, the control circuit 22 can release the overcurrent state through the setting of the voltage of the reference voltage circuit 29 to be higher. After the release, the control circuit 22 turns on the charge/discharge control switch 2 and turns off the pull-down circuit 24. In this manner, the battery device can return to the normal operating state.

As described above, the battery device according to this embodiment can set the overcurrent release voltage depending on the impedance of the load, and hence even when the load has small impedance, the overcurrent can be reliably released.

<Third Embodiment>

Figure 4:
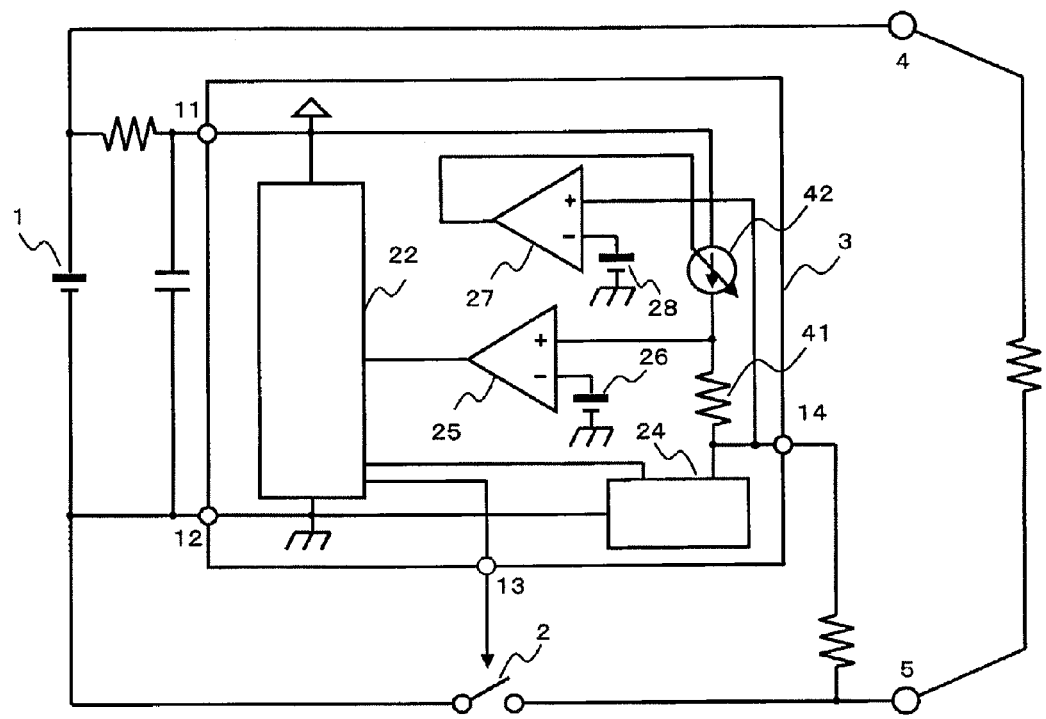
FIG. 4 is a circuit diagram of a battery device according to a third embodiment of the present invention.

FIG. 4 is a circuit diagram of a battery device according to a third embodiment of the present invention.

A battery state monitoring circuit 3 of the battery device according to the third embodiment includes a control circuit 22, a pull-down circuit 24, a comparator circuit 25, a comparator circuit 27, a reference voltage circuit 26, a reference voltage circuit 28, a positive power supply terminal 11, a negative power supply terminal 12, a resistor 41, a current source 42, a charge/discharge control signal output terminal 13, and an overcurrent detection terminal 14.

The resistor 41 has one end connected to the overcurrent detection terminal 14 and the other end connected to a first input terminal of the comparator circuit 25. The current source 42 is connected between the resistor 41 and the positive power supply terminal 11. The comparator circuit 27 has an output terminal connected to a control terminal of the current source 42. The current source 42 switches its output current depending on a signal input to the control terminal. Other circuits and connection relationships are the same as those in the battery device according to the first embodiment.

Next, an operation of the battery device according to the third embodiment is described.

When the comparator circuit 27 outputs no detection signal, the current source 42 causes a predetermined current to flow through the resistor 41. In the resistor 41, a voltage at the other terminal is higher than the voltage of the overcurrent detection terminal 14 by a voltage generated across the resistor 41 due to the current. The comparator circuit 25 compares the voltage of the reference voltage circuit 26 with the voltage at the other terminal of the resistor 41 to detect a discharge overcurrent. In other words, the current source 42 and the resistor 41 apply an offset voltage to the first input terminal of the comparator circuit 25.

In a discharge overcurrent state, a voltage of the overcurrent detection terminal 14 is increased due to a load. At this time, the offset voltage of the first input terminal of the comparator circuit 25 is switched depending on the voltage of the overcurrent detection terminal 14. When the voltage of the overcurrent detection terminal 14 exceeds an output voltage of the reference voltage circuit 28, the current of the current source 42 is switched based on a detection signal output from the comparator circuit 27. For example, the current of the current source 42 is switched to be off so as to set the offset voltage of the first input terminal of the comparator circuit 25 to be zero.

When load impedance is small, the voltage of the overcurrent detection terminal 14 in the discharge overcurrent state is equal to or higher than the voltage of the reference voltage circuit 28. Thus, the voltage of the reference voltage circuit 26 is switched to an apparently higher voltage, and this voltage is referred to as "overcurrent release voltage".

Consequently, even when the load has small impedance and small overcurrent release impedance, the control circuit 22 can release the overcurrent state. After the release, the control circuit 22 turns on the charge/discharge control switch 2 and turns off the pull-down circuit 24. In this manner, the battery device can return to the normal operating state.

As described above, the battery device according to this embodiment can set the overcurrent release voltage depending on the impedance of the load, and hence even when the load has small impedance, the overcurrent can be reliably released.

What is claimed is:

1. A battery state monitoring circuit for controlling charge/discharge of a secondary battery by using a charge/discharge control switch, the battery state monitoring circuit comprising:
an overcurrent detection terminal for inputting a voltage generated in the charge/discharge control switch;
a pull-down circuit connected to the overcurrent detection terminal, for pulling down the overcurrent detection terminal in an overcurrent state;
a first comparator circuit for comparing a voltage of the overcurrent detection terminal with a first reference voltage, and outputting an overcurrent detection signal when the voltage of the overcurrent detection terminal exceeds the first reference voltage;
a second comparator circuit for comparing the voltage of the overcurrent detection terminal with a second reference voltage that is higher than the first reference voltage, and outputting an overcurrent release voltage control signal when the voltage of the overcurrent detection terminal exceeds the second reference voltage; and
a control circuit for turning off the charge/discharge control switch and on the pull-down circuit when the control circuit receives the overcurrent detection signal,
wherein, when the first comparator circuit receives the overcurrent release voltage control signal, the first comparator circuit detects overcurrent release based on a third voltage that is higher than the second reference voltage.

2. A battery device, comprising:
a secondary battery and a charge/discharge control switch that are connected in series between external terminals; and
the battery state monitoring circuit according to claim 1, for controlling charge/discharge of the secondary battery by using the charge/discharge control switch.

* * * * *